US008446647B2

(12) United States Patent
Mamada et al.

(10) Patent No.: US 8,446,647 B2
(45) Date of Patent: May 21, 2013

(54) IMAGE READING DEVICE

(75) Inventors: Haruhiko Mamada, Minato-ku (JP); Shiro Sato, Minato-ku (JP); Katsuhide Shimmo, Minato-ku (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 609 days.

(21) Appl. No.: 12/562,354

(22) Filed: Sep. 18, 2009

(65) Prior Publication Data
US 2010/0067070 A1    Mar. 18, 2010

(30) Foreign Application Priority Data
Sep. 18, 2008    (JP) ................. 2008-239891

(51) Int. Cl.
*H04N 1/04*    (2006.01)
(52) U.S. Cl.
USPC ........... 358/475; 358/509; 358/474; 359/819; 359/622
(58) Field of Classification Search
USPC .......... 358/474, 509, 475, 501, 520; 359/622, 359/811, 819, 619
See application file for complete search history.

(56) References Cited

U.S. PATENT DOCUMENTS

| | | | | |
|---|---|---|---|---|
| 6,014,072 A * | 1/2000 | Gimeno et al. | ................ | 336/173 |
| 6,314,240 B1 * | 11/2001 | Okawara | ................ | 396/81 |
| 6,707,613 B2 * | 3/2004 | Fujimoto et al. | ................ | 359/622 |
| 7,034,967 B2 * | 4/2006 | Ochi et al. | ................ | 358/487 |
| 7,187,857 B2 * | 3/2007 | Okawara | ................ | 396/79 |
| 7,187,867 B2 * | 3/2007 | Kawabe et al. | ................ | 398/126 |
| 7,289,249 B2 * | 10/2007 | Sone | ................ | 358/461 |
| 7,319,244 B2 * | 1/2008 | Liu et al. | ................ | 257/98 |
| 7,548,352 B2 * | 6/2009 | Sakurai et al. | ................ | 358/475 |
| 7,777,958 B2 * | 8/2010 | Shimmo et al. | ................ | 359/622 |
| 7,835,082 B2 * | 11/2010 | Tsujino et al. | ................ | 359/622 |
| 7,982,924 B2 * | 7/2011 | Endo et al. | ................ | 358/474 |
| 8,014,072 B2 * | 9/2011 | Nagata | ................ | 359/621 |
| 8,059,315 B2 * | 11/2011 | Endo et al. | ................ | 358/474 |

(Continued)

FOREIGN PATENT DOCUMENTS

| | | |
|---|---|---|
| JP | 56-142510 A | 11/1981 |
| JP | 05-284278 A | 10/1993 |

(Continued)

OTHER PUBLICATIONS

Japanese Office Action corresponding to Japanese Patent Application No. 2008-239891, dated Sep. 25, 2012. English language translation.

*Primary Examiner* — Negussie Worku
(74) *Attorney, Agent, or Firm* — Sughrue Mion, PLLC

(57) ABSTRACT

An image reading device includes: a line illuminator for irradiating a document G; an erecting equal-magnification lens array operative to condense light reflected by the document G and including a stack of a first lens array plate and a second lens array plate each provided with an arrangement of a plurality of lenses on both sides thereof; a line image sensor operative to receive the light condensed by the erecting equal-magnification lens array; a housing for securing the line illuminator, the erecting equal-magnification lens array, and the line image sensor in their places; and a first light shielding member, a second light shielding member, and a third light shielding member operative to prevent light not contributing to imaging from entering the lenses. The first light shielding member, the second light shielding member, and the third light shielding member are formed as one piece with the main part of the housing.

7 Claims, 3 Drawing Sheets

U.S. PATENT DOCUMENTS

| | | | |
|---|---|---|---|
| 8,077,407 B2 * | 12/2011 | Shimmo et al. | 359/811 |
| 2004/0114121 A1 * | 6/2004 | Nishi et al. | 355/67 |
| 2009/0052044 A1 * | 2/2009 | Nagata | 359/622 |

FOREIGN PATENT DOCUMENTS

| | | |
|---|---|---|
| JP | 2001-352429 A | 12/2001 |
| JP | 2003-202411 A | 7/2003 |
| JP | 2003-302504 A | 10/2003 |
| JP | 2004-070268 A | 3/2004 |
| JP | 2005-122041 A | 5/2005 |
| JP | 2005-138334 A | 6/2005 |
| JP | 2005-249826 A | 9/2005 |

* cited by examiner

IMAGE READING DEVICE

BACKGROUND OF THE INVENTION

1. Field of the Invention

The present invention relates to an image reading device that uses an erecting equal-magnification lens array formed of a plurality of lens array plates.

2. Description of the Related Art

Some image reading devices such as scanners are known to use erecting equal-magnification optics. Erecting equal-magnification optics are capable of reducing the size of devices better than reduction optics. In the case of image reading devices, an erecting equal-magnification optical system comprises a line light source, an erecting equal-magnification lens array, and a line image sensor.

A rod lens array capable of forming an erect equal-magnification image is conventionally used as an erecting equal-magnification lens array in an erecting equal-magnification optical system. Recently, there is proposed a lens array unit formed as a stack of a plurality of transparent lens array plates built such that the optical axes of individual convex lenses are aligned, where each transparent lens array plate includes a systematic arrangement of micro-convex lenses on both planes (see, for example, patent document No. 1). Since a lens array unit such as this comprises a stack of lens array plates formed by, for example, injection molding, an erecting equal-magnification lens arrays can be manufactured at a relatively low cost.

A lens array unit lacks a wall for beam separation between adjacent lenses. Therefore, there is a problem of stray light wherein a light beam diagonally incident on a lens array unit travels diagonally inside the plate and enters an adjacent convex lens, creating a ghost image as it leaves the plate.

Patent document No. 1 discloses a technology to address stray light whereby a light shielding member for shielding unwanted light traveling from an object to be imaged is fitted to the first lens array facing the object. Further, patent document No. 2, for example, discloses a technology whereby a light shielding mask is fitted to the first lens array facing an object to be imaged and to the second lens array facing the photosensitive device.

[patent document No. 1] JP 2001-352429
[patent document No. 2] JP 2003-302504

In the case of the lens array unit described in patent document No. 1 or patent document No. 2, the number of components is increased as a result of providing a light shielding member or a light shielding mask, with the result that the cost of an image reading device having the lens array unit built in may be increased.

SUMMARY OF THE INVENTION

The present invention addresses the disadvantage and a purpose thereof is to provide an inexpensive image reading device.

To solve the problem, an image reading device comprises: a line illuminator for irradiating a document; an erecting equal-magnification lens array operative to condense light reflected by the document and including a stack of a plurality of lens array plates each provided with an arrangement of a plurality of lenses on one side or both sides thereof; a line image sensor operative to receive the light condensed by the erecting equal-magnification lens array; a housing for securing the line illuminator, the erecting equal-magnification lens array, and the line image sensor in their places; and a light shielding member operative to prevent light not contributing to imaging from entering the lenses, wherein at least a part of the light shielding member is formed as one piece with the housing.

According to this embodiment, the number of components is reduced as a result of forming at least a part of the shielding member as one piece with the housing of the image reading device. Therefore, an inexpensive image reading device can be provided.

The erecting equal-magnification lens array may include a first lens array plate provided with a plurality of first outer lenses arranged on one of the surfaces of the plate and with a plurality of first inner lenses arranged on the other surface, and a second lens array plate provided with a plurality of second outer lenses arranged on one of the surfaces of the plate and with a plurality of second inner lenses arranged on the other surface, the first lens array plate and the second lens array plate being stacked such that the first inner lenses and the second inner lenses are respectively opposite to each other. The light shielding member may include a first plate-like light shielding member provided with a plurality of first through holes respectively corresponding to the plurality of first outer lenses, and a second plate-like light shielding member provided with a plurality of second through holes respectively corresponding to the plurality of second outer lenses, the first light shielding member and the second light shielding member being formed as one piece with the housing such that the members create a predetermined space therebetween. The first lens array plate and the second lens array plate may be secured to the housing by being inserted into a space between the first light shielding member and the second light shielding member such that the plurality of first outer lenses directly face the corresponding first through holes, and the plurality of second outer lenses directly face the corresponding second through holes.

In this case, the first and second lens array plates are secured by the first and second shielding members formed as one piece with the housing. Therefore, the first and second lens array plates are mounted at predetermined positions in the housing with high precision, with the result that imaging performance is improved.

A third plate-like light shielding member, provided with a plurality of through holes respectively corresponding to the first inner lenses and the second inner lenses, may be formed between the first lens array plate and the second lens array plate as one piece with the housing. In this case, light not contributing to imaging is further shielded.

Each of the first light shielding member and the second light shielding member may be joined to the housing at one of the lateral ends thereof, and the first and second lens array plates may be secured to the housing by being inserted into a space between the first light shielding member and the second light shielding member from the other open lateral end. In this case, insertion of the first and second lens array plates is facilitated so that the number of steps of assembly can be reduced.

The first and/or second lens array plate have tapered parts at the respective front ends inserted into a space between the first light shielding member and the second light shielding member. In this case, insertion of the first and/or second lens array plates is facilitated so that the number of steps of assembly can be reduced.

The first lens array plate and the second lens array plate may be joined at one of the lateral ends so as to be parallel with each other and to create a predetermined space therebetween. Thus, by forming the first and second lens array plates as one piece, the number of components is reduced and the number of steps of assembly can be reduced. Therefore, a more inexpensive image reading device can be provided.

The entirety of the shielding member may be formed as one piece with the housing.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
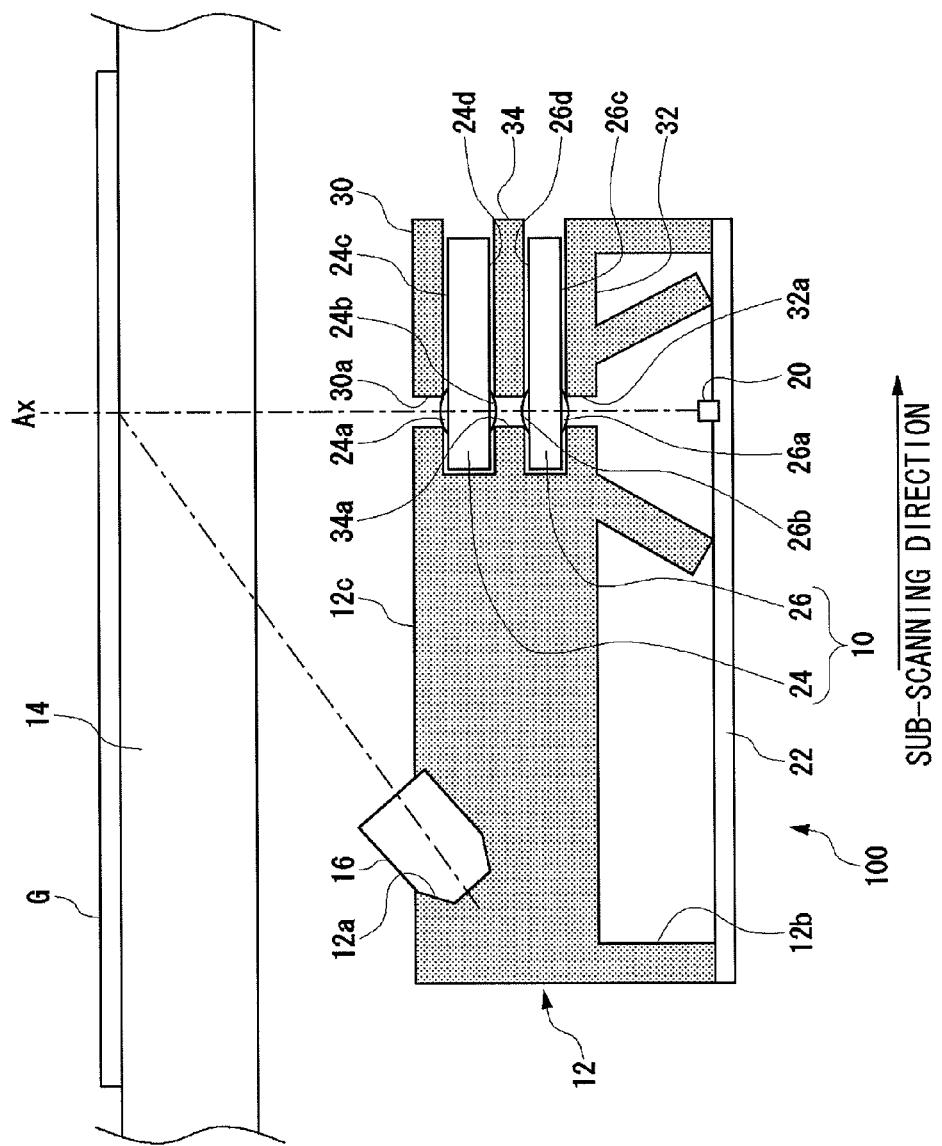
FIG. 1 is a sectional view of an image reading device according to an embodiment of the present invention.

FIG. 1 is a sectional view of an image reading device 100 according to an embodiment of the present invention. As shown in FIG. 1, the image reading device 100 comprises a line illuminator 16 for illuminating a document G placed on a glass plate 14 provided in the upper part of the image reading device 100 with light, an erecting equal-magnification lens array 10 for condensing light reflected from the document G, a line image sensor (photoelectric transducer) 20 for receiving light condensed by the erecting equal-magnification lens array 10, and a housing 12 for securing the line illuminator 16, the erecting equal-magnification lens array 10, and the line image sensor 20 in their places.

The housing 12 has a main part 12c substantially rectangular in shape. A recess 12a is formed in the upper part of the main part 12c and a recess 12b is formed in the lower part. The line illuminator 16 is diagonally fixed inside the recess 12a in the upper part. The line illuminator 16 is fixed such that the optical axis of the illuminating light passes through the intersection between the optical axis Ax of the erecting equal-magnification lens array 10 and the upper plane of the glass plate 14. A substrate 22 provided with the line image sensor 20 is fitted in the recess 12b in the lower part. The erecting equal-magnification lens array 10 is provided above the line image sensor 20.

In the image reading device 100, the light exiting the line irradiator device 16 irradiates the document G through the glass plate 14. The document G is read by allowing the line image sensor 20 to detect the light reflected from the document G via the erecting equal-magnification lens array 10. A desired area on the document G is read by scanning the housing 12 in the sub-scanning direction with respect to the glass plate 14.

The erecting equal-magnification lens array 10 comprises a stack of a first lens array plate 24 and a second lens array plate 26. According to the embodiment, the first lens array plate 24 and the second lens array plate 26 have the same shape. The first lens array plate 24 and the second lens array plate 26 are rectangular in shape. A plurality of convex lenses are arranged on both surfaces of the plate. In other words, a plurality of first outer lenses 24a are systematically arranged on a first outer side surface 24c of the first lens array plate 24, and a plurality of first inner lenses 24b are systematically arranged on a first inner side surface 24d. A plurality of second outer lenses 26a are systematically arranged on a second outer side surface 26c of the second lens array plate 26, and a plurality of second inner lenses 26b are systematically arranged on a second inner side surface 26d.

According to the embodiment, the first outer lens 24a, the first inner lens 24b, the second outer lens 26a, and the second inner lens 26b have the same shape. The lenses are arranged at the same pitch in the longitudinal direction of the lens array plate. Thus, when the first lens array plate 24 and the second lens array plate 26 are placed such that the first inner lenses 24b and the second inner lenses 26b are opposite to each other, the optical axes of the corresponding four lenses are aligned. According to the embodiment, it is assumed that the first outer lens 24a, the first inner lens 24b, the second outer lens 26a, and the second inner lens 26b are spherical in shape. Alternatively, the lenses may have aspherical shapes.

The first lens array plate 24 and the second lens array plate 26 are formed by injection molding. Preferably, each of the first lens array plate 24 and the second lens array plate 26 is formed of a material amenable to injection molding, having high light transmittance in a required wavelength range, and having low water absorption. Desired materials include cycloolefin resins, olefin resins, norbornene resins, and polycarbonate.

In the first lens array plate 24 and the second lens array plate 26, a plurality of lenses are arranged in a row in the longitudinal direction. The erecting equal-magnification lens array 10 is configured to receive substantially straight light reflected from the document G located above and form an erect equal-magnification image on an image plane located below, i.e., a light-receiving surface of the line image sensor 20. The erecting equal-magnification lens array 10 is installed in the image reading device 100 such that the longitudinal direction thereof is aligned with the main scanning direction and the lateral direction thereof is aligned with the sub-scanning direction.

In this embodiment, the first lens array plate 24 and the second lens array plate 26 are held by a first light shielding member 30, a second light shielding member 32, and a third light shielding member 34 such that the first inner lens 24b and the second inner lens 26b are opposite to each other.

The first light shielding member 30, the second light shielding member 32, and the third light shielding member 34 are rectangular plate members having substantially the same size. Each of the first light shielding member 30 and the second light shielding member 32 is joined to the side of the main part 12c of the housing 12 at the left ends of the members, i.e., at one of the lateral ends thereof such that the members are parallel and create a predetermined space therebetween. The third light shielding member 34 is provided between the first light shielding member 30 and the second light shielding member 32 and parallel with the first light shielding member 30 and the second light shielding member 32. The left end of the third light shielding member 34 is joined to the side of the main part 12c of the housing 12. The space between the first light shielding member 30 and the third light shielding member 34 and the space between the second light shielding member 32 and the third light shielding member 34 are each formed to be equal to or slightly larger than the thickness of the first lens array plate 24 and the second lens array plate 26 so that the first lens array plate 24 and the second lens array plate 26 can be inserted into the space.

A plurality of first through holes 30a corresponding to the plurality of first outer lenses 24a of the first lens array plate 24 are formed in the first light shielding member 30. A plurality of second through holes 32a corresponding to the plurality of second outer lenses 26a of the second lens array plate 26 are formed in the second light shielding member 32. A plurality of third through holes 34a corresponding to the plurality of first inner lenses 24b of the first lens array plate 24 and the second inner lenses 26b of the second lens array plate 26 are formed in the third light shielding member 34. The first through holes 30a, the second through holes 32a, and the third through holes 34a are cylindrical in shape.

According to the embodiment, the first through holes 30a, the second through holes 32a, and the third through holes 34a have the same shape and are arranged at the same pitch in the longitudinal direction of the first light shielding member 30, the second light shielding member 32, and the third light shielding member 34, respectively. The central axes of the corresponding three through holes are aligned. The diameter of each of the first through holes 30a, the second through holes 32a, and the third through holes 34a is designed to be substantially the same as or slightly smaller than the diameter of the effective region of each of the first outer lenses 24a, the first inner lenses 24b, the second outer lenses 26a, and the second inner lenses 26b. The term "effective region of a lens" refers to a portion having the function of a lens. The pitch of arrangement of the first through holes 30a, the second through holes 32a, and the third through holes 34a is identical to the pitch of arrangement of the first outer lenses 24a, the first inner lenses 24b, the second outer lenses 26a, and the second inner lenses 26b.

The first light shielding member 30, the second light shielding member 32, and the third light shielding member 34 are formed of a light shielding material so as to be one piece with the main part 12c of the housing 12. According to the embodiment, the main part 12c of the housing 12 is formed of a light shielding material but not necessarily so. Alternatively, the housing 12 may be formed by multicolor molding (e.g., dual color molding). The housing 12 may be formed by, for example, injection molding. Preferably, the shielding material is amenable to injection molding and is highly capable of shielding light in a desired wavelength band. For example, the shielding material may be an ABS resin.

According to the embodiment, the first lens array plate 24 is held by the housing 12 by being inserted into a space between the first light shielding member 30 and the third light shielding member 34 from the open right end side in the lateral direction. The second lens array plate 26 is held by the housing 12 by being inserted into a space between the second light shielding member 32 and the third light shielding member 34 from the open right end side in the lateral direction. When inserting the first lens array plate 24 or the second lens array plate 26, the lateral open ends of the first light shielding member 30, the second light shielding member 32, and the third light shielding member 34 are extended. The ends are then closed after the plates are inserted. This prevents the lens array plate according to the embodiment formed with convex lenses from being damaged in the process of insertion.

In a state where the first lens array plate 24 is inserted into a space between the first light shielding member 30 and the third light shielding member 34, the plurality of first outer lenses 24a directly face the corresponding first through holes 30a of the first light shielding member 30, and a part of each of the first outer lenses 24a is set in the respective first through holes 30a. The plurality of first inner lenses 24b directly face the corresponding third through holes 34a of the third light shielding member 34, and a part of each of the first inner lenses 24b is set in the respective second through holes 32a. In a state where the second lens array plate 26 is inserted into a space between the second light shielding member 32 and the third light shielding member 34, the plurality of second outer lenses 26a directly face the corresponding second through holes 32a of the second light shielding member 32, and a part of each of the second outer lenses 26a is set in the respective second through holes 32a. The plurality of second inner lenses 26b directly face the corresponding third through holes 34a of the third light shielding member 34, and a part of each of the second inner lenses 26b is set in the respective third through holes 34a.

By producing the assembly as described above, the area on the first outer side surface 24c of the first lens array plate 24 outside the effective region of the first outer lenses 24a is covered by the first light shielding member 30, and the area on the first inner side surface 24d outside the effective region of the first inner lenses 24b is covered by the third light shielding member 34. Further, the area on the second outer side surface 26c of the second lens array plate 26 outside the effective region of the second outer lenses 26a is covered by the second light shielding member 32, and the area on the second inner side surface 26d outside the effective region of the second inner lenses 26b is covered by the third light shielding member 34. Therefore, the first light shielding member 30 prevents light not contributing to imaging (hereinafter, referred to as stray light) from being incident on the first outer lenses 24a. The third light shielding member 34 prevents stray light from exiting the first inner lenses 24b and prevents stray light from being incident on the second inner lenses 26b. The second light shielding member 32 prevents stray light from exiting the second inner lenses 26a.

As described, according to the embodiment, the first light shielding member 30, the second light shielding member 32, and the third light shielding member 34 for eliminating stray light incident on the lenses formed in the first lens array plate 24 and the second lens array plate 26 are formed as one piece with the main part 12c of the housing 12. Therefore, extra light shielding members need not be provided and the number of components is reduced so that the image reading device 100 can be manufactured at a reduced cost.

Since, according to the embodiment, the first light shielding member 30, the second light shielding member 32, and the third light shielding member 34 are formed as one piece with the main part 12c of the housing 12, the first through holes 30a, the second through holes 32a, and the third through holes 34a are formed with high precision with respect to the main part 12c. Since the lenses of the first lens array plate 24 and the second lens array plate 26 are set in the first through holes 30a, the second through holes 32a, and the third through holes 34a formed with high precision, displacement of optical axes of the corresponding four lenses is prevented so that the imaging performance is consequently improved.

According to the embodiment, the first lens array plate 24 and the second lens array plate 26 are inserted from the open lateral end. This ensures that the first lens array plate 24 and the second lens array plate 26 need to be pressed a relatively short distance, thereby facilitating the assembly.

In a structure where the lens array unit as a separate component is fitted to the housing, as is patent documents 1 and 2, a projection structure for securing the lens array unit to the housing will be necessary. In this case, it may be difficult to secure distance between the housing and the glass plate due to the projection structure. Unless a certain distance is secured between the housing and the glass plate, there is a possibility that the glass plate and the case may come into contact due, for example, to the bend of the glass plate. Since the embodiment does not require a projection structure, the distance between the glass plate 14 and the housing 12 can be easily secured so that contact between the glass plate 14 and the housing 12 is prevented.

Figure 2:
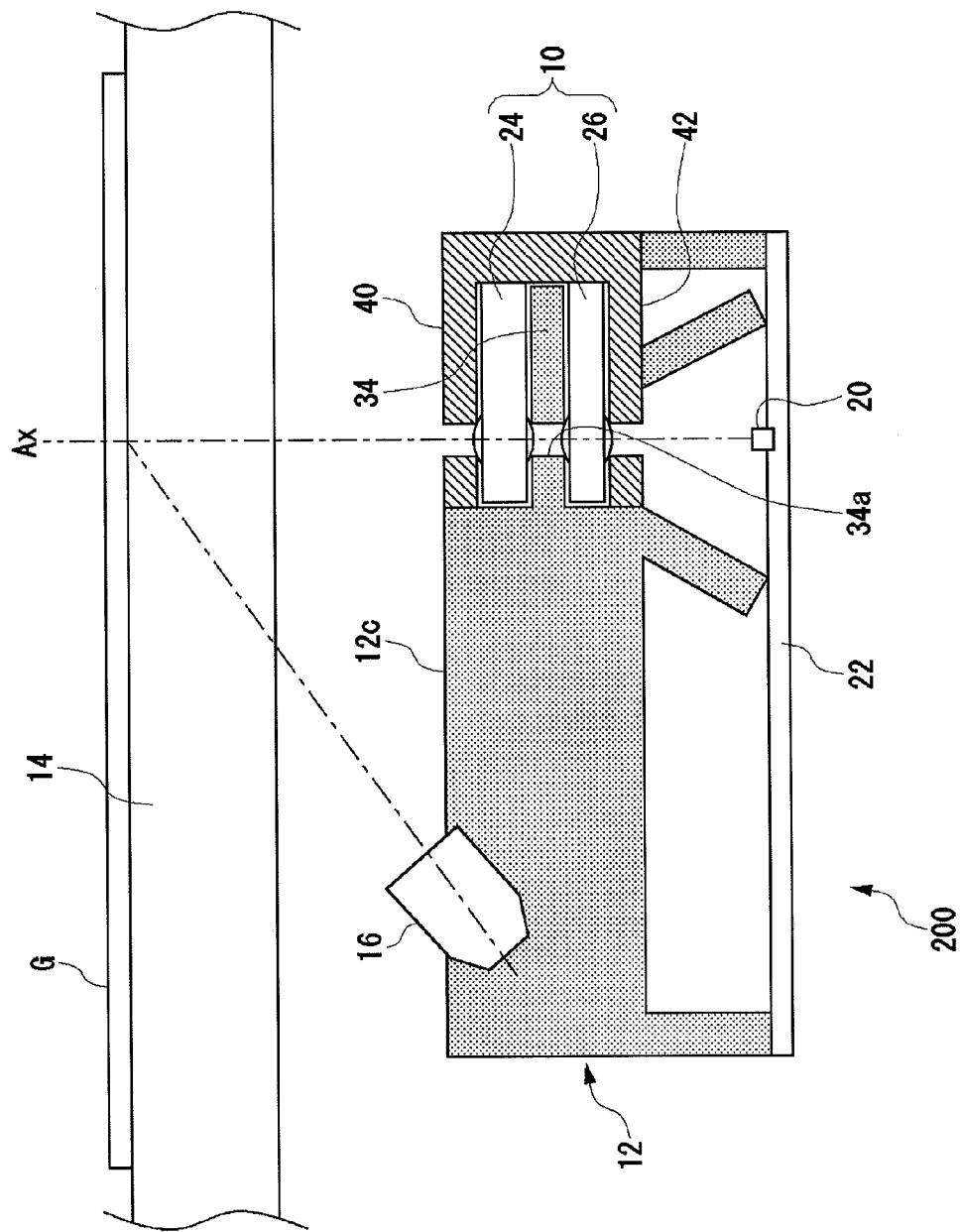
FIG. 2 is a sectional view of an image reading device according to another embodiment of the present invention.

FIG. 2 is a sectional view of an image reading device 200 according to another embodiment of the present invention. Those constituting elements corresponding to those of the image reading device 100 shown in FIG. 1 are denoted by the same reference numerals and the description of the elements is omitted as needed.

In the image reading device 200, only the third light shielding member 34 located between the first lens array plate 24 and the second lens array plate 26 is formed as one piece with the main part 12c of the housing 12. A first light shielding member 40 located above the first lens array plate 24 and a second light shielding member 42 located below the second lens array plate 26 are formed as components separate from the main part 12c. The first light shielding member 40 and the second light shielding member 42 are joined at the right lateral ends.

Even if only the third light shielding member 34 is formed as one piece with the main part 12c of the housing 12, the number of components is reduced so that the image reading device 200 can be manufactured at a reduced cost.

Since the alternative embodiment also allows the lenses of the first lens array plate 24 and the second lens array plate 26 to be arranged with reference to the third through holes 34a of the third light shielding member 34 formed as one piece with the main part 12c of the housing 12, displacement of optical axes of the corresponding four lenses is prevented so that the imaging performance is consequently improved.

In this embodiment, only the third light shielding member is formed as one piece with the main part 12c of the housing 12. Alternatively, only the first light shielding member 30 or the second light shielding member 32 may be formed as one piece with the main part 12c of the housing 12. Still alternatively, only two of the first through third light shielding members may be formed as one piece with the main part 12c of the housing 12.

Figure 3:
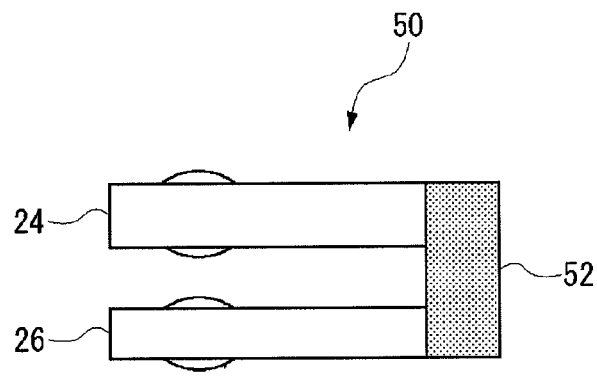
FIG. 3 shows an erecting equal-magnification lens array according to a variation of the embodiment.

FIG. 3 shows an erecting equal-magnification lens array according to a variation. An erecting equal-magnification lens array 50 shown in FIG. 3 is such that the first lens array plate 24 and the second lens array plate 26 are joined by a connecting member 52 at the right lateral ends of the plates so as to be parallel with each other and to create a predetermined space therebetween. Thus, by forming the first lens array plate 24 and the second lens array plate 26 as one piece, the number of components is reduced and the number of steps of assembly is reduced. Therefore, a more inexpensive image reading device can be provided.

The erecting equal-magnification lens array plate 50 shown in FIG. 3 may be formed by injection molding. In forming the array by injection molding, it is preferable to form the first lens array plate 24 and the second lens array plate 26 of a translucent material in dual-color molding and to form the connecting member 52 of a light shielding material. In this case, stray light entering at the right lateral end is effectively eliminated when the erecting equal-magnification lens array 50 is fitted to the housing 12.

Figure 4:
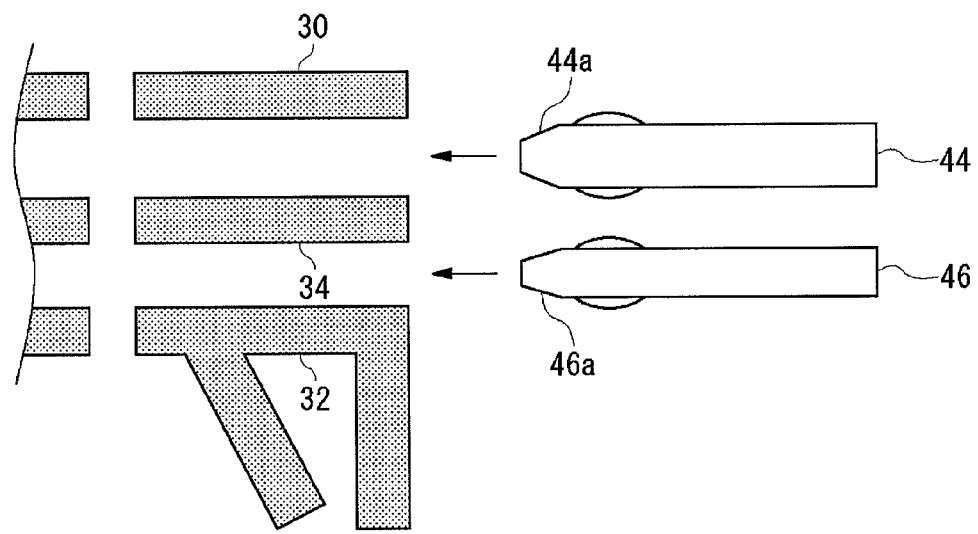
FIG. 4 shows first and second lens array plates according to a variation.

FIG. 4 shows the first and second lens array plates according to a variation. As shown in FIG. 4, a first lens array plate 44 and a second lens array plate 46 have tapered parts 44a and 46a at the respective front ends inserted into a space between the first light shielding member 30 and the third light shielding member 34 and a space between the third light shielding member 34 and the second light shielding member 32, respectively.

By providing the plates with the tapered parts 44a and 46a, the first lens array plate 24 and the second lens array plate 26 can be easily inserted into a space between the first light shielding member 30 and the third light shielding member 34 and a space between the third light shielding member 34 and the second light shielding member 32, respectively. As a result, the number of steps of assembly is reduced so that the image reading device can be manufactured at a lower cost.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described, a stack of two lens array plates is built to form a lens array unit for forming an erecting equal-magnification image. The number of plates stacked is not limited to two. For example, an additional lens array plate may be inserted between the first lens array plate and the second lens array plate so as to form a lens array unit. In the embodiments, a lens array plate wherein lenses are formed on both surfaces thereof is used. Alternatively, a plurality of lens array plates each formed with lenses on only one surface thereof may be stacked to form a lens array unit.

In the embodiments described, the lenses and the through holes are each arranged in a line. The pattern of arranging the lenses or holes is not non-limiting. For example, the lenses and the through holes may be arranged in a plurality of lines.

In the described embodiments, the diameters of the first through third through holes 30a, 32a, and 34a in the first through third light shielding members 30, 32, and 34 are identical to each other. Alternatively, the diameters of the through hole may be different for each light shielding member, depending on the design of the optical system such as lenses.

What is claimed is:

1. An image reading device comprising:
a line illuminator for irradiating a document;
an erecting equal-magnification lens array operative to condense light reflected by the document and including a stack of a plurality of lens array plates each provided with an arrangement of a plurality of lenses on one side or both sides thereof;
a line image sensor operative to receive the light condensed by the erecting equal-magnification lens array;
a housing for securing the line illuminator, the erecting equal-magnification lens array, and the line image sensor in their places; and
a light shielding member operative to prevent light not contributing to imaging from entering the lenses, wherein
at least a part of the light shielding member is formed as one piece with the housing.

2. The image reading device according to claim 1 wherein the entirety of the light shielding member is formed as one piece with the housing.

3. An image reading device comprising:
a line illuminator for irradiating a document;
an erecting equal-magnification lens array operative to condense light reflected by the document and including a stack of a plurality of lens array plates each provided with an arrangement of a plurality of lenses on one side or both sides thereof;

a line image sensor operative to receive the light condensed by the erecting equal-magnification lens array;

a housing for securing the line illuminator, the erecting equal-magnification lens array, and the line image sensor in their places; and a light shielding member operative to prevent light not contributing to imaging from entering the lenses, wherein at least a part of the light shielding member is formed as one piece with the housing, wherein the erecting equal-magnification lens array includes a first lens array plate provided with a plurality of first outer lenses arranged on one of the surfaces of the plate and with a plurality of first inner lenses arranged on the other surface, and a second lens array plate provided with a plurality of second outer lenses arranged on one of the surfaces of the plate and with a plurality of second inner lenses arranged on the other surface, the first lens array plate and the second lens array plate being stacked such that the first inner lenses and the second inner lenses are respectively opposite to each other, the light shielding member includes a first plate-like light shielding member provided with a plurality of first through holes respectively corresponding to the plurality of first outer lenses, and a second plate-like light shielding member provided with a plurality of second through holes respectively corresponding to the plurality of second outer lenses, the first light shielding member and the second light shielding member being formed as one piece with the housing such that the members create a predetermined space therebetween, and the first lens array plate and the second lens array plate are secured to the housing by being inserted into a space between the first light shielding member and the second light shielding member such that the plurality of first outer lenses directly face the corresponding first through holes, and the plurality of second outer lenses directly face the corresponding second through holes.

4. The image reading device according to claim 3, wherein a third plate-like light shielding member, provided with a plurality of through holes respectively corresponding to the first inner lenses and the second inner lenses, is formed between the first lens array plate and the second lens array plate as one piece with the housing.

5. The image reading device according to claim 3, wherein each of the first light shielding member and the second light shielding member is joined to the housing at one of the lateral ends thereof, and the first and second lens array plates are secured to the housing by being inserted into a space between the first light shielding member and the second light shielding member from the other open lateral end.

6. The image reading device according to claim 3, wherein the first and/or second lens array plate have tapered parts at the respective front ends inserted into a space between the first light shielding member and the second light shielding member.

7. The image reading device according to claim 3, wherein the first lens array plate and the second lens array plate are joined at one of the lateral ends so as to be parallel with each other and to create a predetermined space therebetween.

* * * * *